(12) United States Patent
Suzuki

(10) Patent No.: US 11,923,684 B2
(45) Date of Patent: Mar. 5, 2024

(54) CONTROL APPARATUS, CONTROL METHOD, AND COMPUTER-READABLE MEDIUM

(71) Applicant: FUJI ELECTRIC CO., LTD., Kanagawa (JP)

(72) Inventor: Ryohei Suzuki, Hachiouji (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 135 days.

(21) Appl. No.: 17/367,408

(22) Filed: Jul. 4, 2021

(65) Prior Publication Data

US 2022/0029421 A1 Jan. 27, 2022

(30) Foreign Application Priority Data

Jul. 22, 2020 (JP) ................................. 2020-125821

(51) Int. Cl.
*H02J 3/18* (2006.01)
*G05B 13/02* (2006.01)
(Continued)

(52) U.S. Cl.
CPC .............. *H02J 3/18* (2013.01); *G05B 13/024* (2013.01); *H02J 3/381* (2013.01); *H02J 13/00002* (2020.01)

(58) Field of Classification Search
CPC ........ H02J 3/18; H02J 3/381; H02J 13/00002; H02J 2203/10; H02J 3/001; H02J 3/06;
(Continued)

(56) References Cited

U.S. PATENT DOCUMENTS 11,239,661 B2    2/2022  Quitmann
2011/0299470 A1* 12/2011 Muller ..................... H04Q 9/00
                                                 370/328
(Continued)

FOREIGN PATENT DOCUMENTS

DE     102018102220 A1    8/2019
JP        2007288877 A   11/2007
(Continued)

OTHER PUBLICATIONS

Office Action issued for counterpart German Application 102021117512.7, issued by the German Intellectual Property Office dated Feb. 2, 2022.

*Primary Examiner* — Charles Cai

(57) ABSTRACT

Even when a fault occurs on an electric power system, a command signal based on appropriate calculation is given to a distributed power supply. Provided is a control apparatus configured to control a plurality of distributed power supplies connected to an electric power system. The control apparatus comprises: a first calculation unit configured to calculate in advance reactive electric power to be output by each of the distributed power supplies in the event of a fault on the electric power system; and a command output unit configured to output, to each of the distributed power supplies, a command signal for causing each of the distributed power supplies to output the reactive electric power calculated in advance by the first calculation unit when it is detected that a fault has occurred on the electric power system.

17 Claims, 7 Drawing Sheets

(51) Int. Cl.
*H02J 3/38* (2006.01)
*H02J 13/00* (2006.01)

(58) Field of Classification Search
CPC .. H02J 3/16; H02J 3/50; G05B 13/024; G05B 15/02; Y04S 10/30; Y04S 10/12; Y04S 10/22; Y02E 40/30; Y02E 40/70; Y02E 60/00
See application file for complete search history.

(56) References Cited

U.S. PATENT DOCUMENTS

| | | | | |
|---|---|---|---|---|
| 2012/0169482 | A1* | 7/2012 | Chen | G08C 17/02 340/12.52 |
| 2012/0173035 | A1 | 7/2012 | Abe | |
| 2013/0077367 | A1* | 3/2013 | Zhu | H02J 3/16 323/205 |
| 2015/0194966 | A1* | 7/2015 | Kimura | G05B 15/02 700/287 |
| 2017/0353033 | A1* | 12/2017 | Kuroda | G05B 19/042 |
| 2018/0152020 | A1 | 5/2018 | Kuroda | |
| 2018/0375329 | A1 | 12/2018 | Kuroda | |
| 2019/0260205 | A1 | 8/2019 | Kato | |
| 2019/0288551 | A1* | 9/2019 | Tsubota | G06Q 10/04 |

FOREIGN PATENT DOCUMENTS

| | | |
|---|---|---|
| JP | 2011061970 A | 3/2011 |
| JP | 2013074668 A | 4/2013 |
| JP | 2016208654 A | 12/2016 |
| JP | 2017060355 A | 3/2017 |
| JP | 2017112709 A | 6/2017 |
| JP | 2018057117 A | 4/2018 |
| JP | 2018057119 A | 4/2018 |

* cited by examiner

CONTROL APPARATUS, CONTROL METHOD, AND COMPUTER-READABLE MEDIUM

The contents of the following Japanese patent application are incorporated herein by reference:
NO. 2020-125821 filed in JP on Jul. 22, 2020.

BACKGROUND

1. Technical Field

The present invention relates to a control apparatus, a control method, and a computer-readable medium.

2. Related Art

In the related art, known is technology of executing power flow calculation when a fault occurs on an electric power network system (for example, Patent Document 1). Patent Documents 2 to 8 also disclose related technologies. Patent Document 1: Japanese Patent Application Publication No. 2011-61970
Patent Document 2: Japanese Patent Application Publication No. 2016-208654
Patent Document 3: Japanese Patent Application Publication No. 2017-60355
Patent Document 4: Japanese Patent Application Publication No. 2017-112709
Patent Document 5: Japanese Patent Application Publication No. 2018-57117
Patent Document 6: Japanese Patent Application Publication No. 2018-57119
Patent Document 7: Japanese Patent Application Publication No. 2013-074668
Patent Document 8: Japanese Patent Application Publication No. 2007-288877

SUMMARY OF INVENTION

Technical Problem

In a control apparatus configured to control a plurality of distributed power supplies connected to an electric power system, it is preferable that a command signal based on appropriate calculation is given to the distributed power supplies even when a fault occurs on the electric power system.

Technical Solution

In order to solve the above problem, an aspect of the present invention provides a control apparatus configured to control a plurality of distributed power supplies connected to an electric power system. The control apparatus may comprise a first calculation unit and a command output unit. The first calculation unit may be configured to calculate in advance reactive electric power to be output by each of the distributed power supplies in an event of a fault on the electric power system. The command output unit may be configured to output, to each of the distributed power supplies, a command signal for causing each of the distributed power supplies to output the reactive electric power calculated in advance by the first calculation unit when it is detected that a fault has occurred on the electric power system.

The first calculation unit may also be configured to calculate the reactive electric power in advance for each of two or more types of faults on the electric power system. The command output unit may also be configured to output the command signal corresponding to a type of a fault that has occurred on the electric power system.

The first calculation unit may also be configured to further calculate an output suppression amount in each of the distributed power supplies in an event of a fault on the electric power system. The command output unit may also be configured to output the command signal further including information corresponding to the output suppression amount.

The first calculation unit may also be configured to calculate the output suppression amount in advance for each of two or more types of faults on the electric power system. The command output unit may also be configured to output the command signal corresponding to a type of a fault that has occurred on the electric power system.

The control apparatus may also further comprise a second calculation unit configured to input, to the first calculation unit, system data including an electric power parameter at a plurality of nodes of the electric power system. The first calculation unit may also be configured to update the reactive electric power to be output by the distributed power supplies, at a cycle longer than a data cycle of the system data, based on the system data.

The first calculation unit may also be configured, when an electric power parameter at any node among a plurality of nodes cannot be acquired, to complement missing data at the node at which the electric power parameter cannot be acquired.

An aspect of the present invention provides a control method of controlling a plurality of distributed power supplies connected to an electric power system by a computer. The control method may comprise performing first calculation of calculating in advance reactive electric power to be output by each of the distributed power supplies in an event of a fault on the electric power system. The control method may comprise outputting, to each of the distributed power supplies, a command signal for causing each of the distributed power supplies to output the reactive electric power calculated in advance in the first calculation step when it is detected that a fault has occurred on the electric power system.

An aspect of the present invention provides a computer-readable medium having recorded thereon a program that, when executed by a computer, causes the computer to execute a sequence of controlling a plurality of distributed power supplies connected to an electric power system. The control may comprise performing first calculation of calculating in advance reactive electric power to be output by each of the distributed power supplies in an event of a fault on the electric power system. The control may comprise outputting, to each of the distributed power supplies, a command signal for causing each of the distributed power supplies to output the reactive electric power calculated in advance in the first calculation when it is detected that a fault has occurred on the electric power system.

The summary clause does not necessarily describe all necessary features of the embodiments of the present invention. The present invention may also be a sub-combination of the features described above.

DESCRIPTION OF EXEMPLARY EMBODIMENT

Hereinafter, the present invention will be described through embodiments of the invention. However, the following embodiments do not limit the invention defined in the claims. Also, all combinations of features described in the embodiments are not necessarily essential to solutions of the invention.

Figure 1:
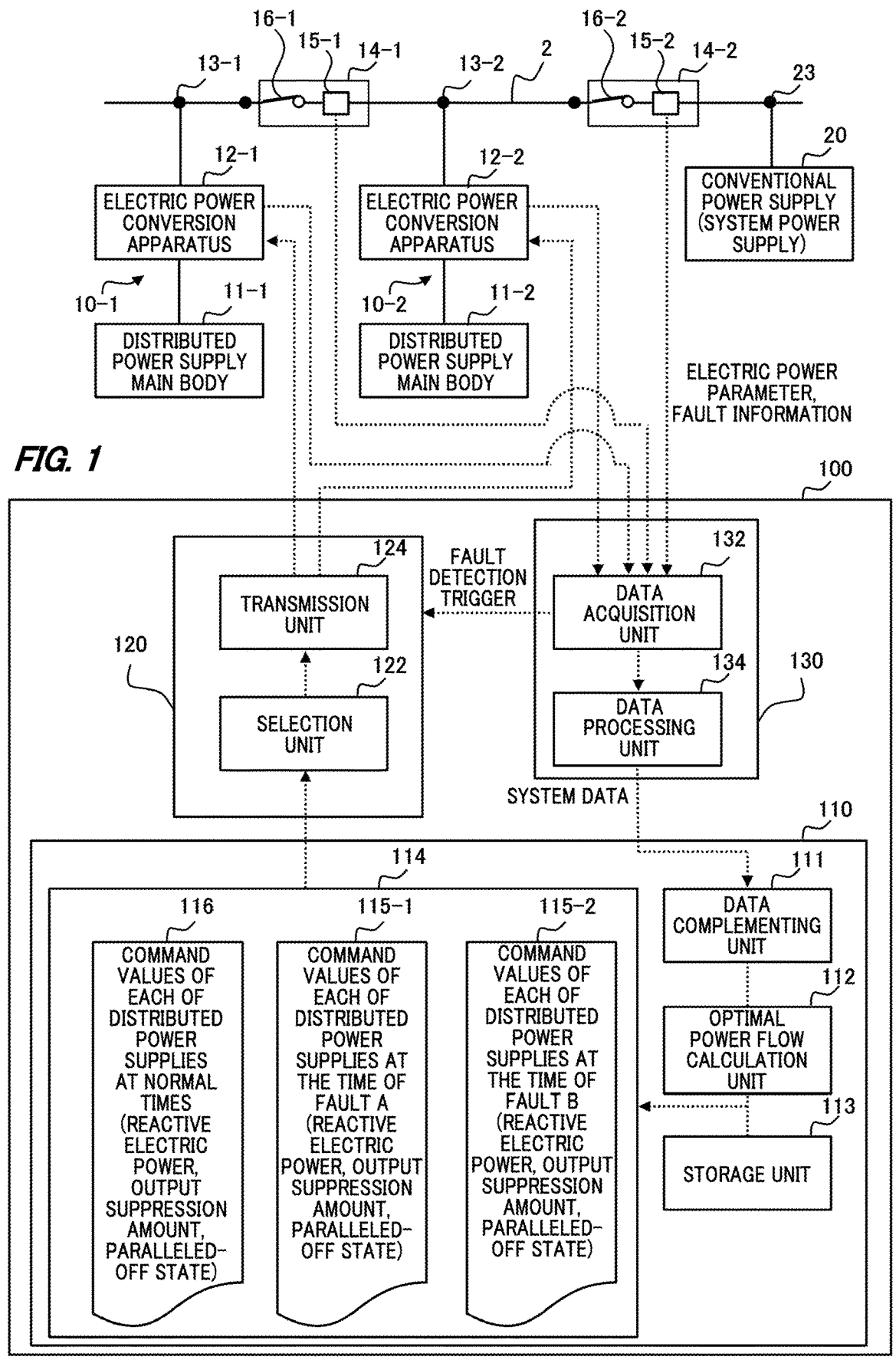
FIG. 1 shows an example of a configuration of a control apparatus 100 according to an embodiment of the present invention.

FIG. 1 shows an example of a configuration of a control apparatus 100 according to an embodiment of the present invention. The control apparatus 100 of the present embodiment is configured to calculate in advance active electric power and reactive electric power to be output by each of distributed power supplies 10-1 and 10-2, at a predetermined cycle, assuming that a fault occurs on an electric power system 2. When a fault actually occurs, the control apparatus 100 outputs, to the distributed power supplies 10-1 and 10-2, a command signal for causing the distributed power supplies 10-1 and 10-2 to output the active electric power and the reactive electric power calculated in advance.

When a fault occurs, the distributed power supplies 10-1 and 10-2 suppress an output of the active electric power. The control apparatus 100 may also be configured to calculate in advance an output suppression amount in each of the distributed power supplies 10-1 and 10-2, as information of the active electric power to be output. When a fault actually occurs, the control apparatus 100 may output a command signal including information corresponding to the output suppression amount calculated in advance. The output suppression amount may be information relating to a suppression amount of active electric power in each of the distributed power supplies 10-1 and 10-2. The output suppression amount may be a target value of active electric power, an amount of reduction or an attenuation rate from the current active electric power.

The control apparatus 100 may be constituted by one or more computers. The computer may be a workstation or a personal computer.

The electric power system 2 is electrically connected to the plurality of distributed power supplies 10-1 and 10-2. The electric power system 2 may also be connected to at least one conventional power supply 20. The number of the distributed power supplies 10-1 and 10-2 and the number of the conventional power supply 20 are not limited to the case shown in FIG. 1.

The distributed power supplies 10-1 and 10-2 (which may also be collectively referred to as the distributed power supply 10) are small-scale electric power generation facilities that are distributively arranged. The distributed power supply 10 may also be referred to as a distribution-type power supply. The distributed power supply 10 may also be a power supply for a solar panel-based solar power generation apparatus, a wind electric power generation apparatus, a fuel cell electric power generation apparatus and the like.

The distributed power supply 10-1 includes a distributed power supply main body 11-1 and an electric power conversion apparatus 12-1. The distributed power supply main body 11-1 is configured to generate electric power. The electric power conversion apparatus 12-1 is configured to convert the electric power generated by the distributed power supply main body 11-1 into electric power corresponding to the electric power system 2. The electric power conversion apparatus 12-1 may also be an apparatus referred to as a PCS (Power Conditioning System) or an inverter. Similarly, the distributed power supply 10-2 also includes a distributed power supply main body 11-2 and an electric power conversion apparatus 12-2.

The conventional power supply 20 is also referred to as a system power supply or a non-distributed power supply. The conventional power supply 20 may also be a facility configured to supply electric power provided by an electric power company that manages the electric power system 2. The conventional power supply 20 may be, for example, an electric power plant, an electric power substation or a transformer. The electric power system 2 may be an electric power distribution system under control of the conventional power supply 20. The distributed power supplies 10-1 and 10-2 and the conventional power supply 20 constitute a node respectively connected to the electric power system 2 at a node point 13-1, a node point 13-2, and a node point 23.

The electric power system 2 may be provided with fault detection units 14-1 and 14-2. The fault detection units 14-1 and 14-2 (which may be collectively referred to as the fault detection unit 14) may be provided at a plurality of predetermined positions in the electric power system 2. The fault detection unit 14-1 may include a sensor unit 15-1 and a switch 16-1. Similarly, the fault detection unit 14-2 may include a sensor unit 15-2 and a switch 16-2. The fault detection unit 14 is also referred to as an overload relay. The sensor unit 15 is configured to measure electric power or current that flows through an electric power transmission line in the electric power system 2. The fault detection unit 14 may also be configured to calculate an integrated value obtained by integrating a time during which a value measured by the sensor unit 15 exceeds an upper limit value (wiring capacity) and a deviation amount that exceeds the upper limit value. The fault detection unit 14 may determine that a fault has occurred when the integrated value exceeds a predetermined value. The switches 16-1 and 16-2 cut off supply of electric power when it is determined that a fault has occurred.

Figure 2:
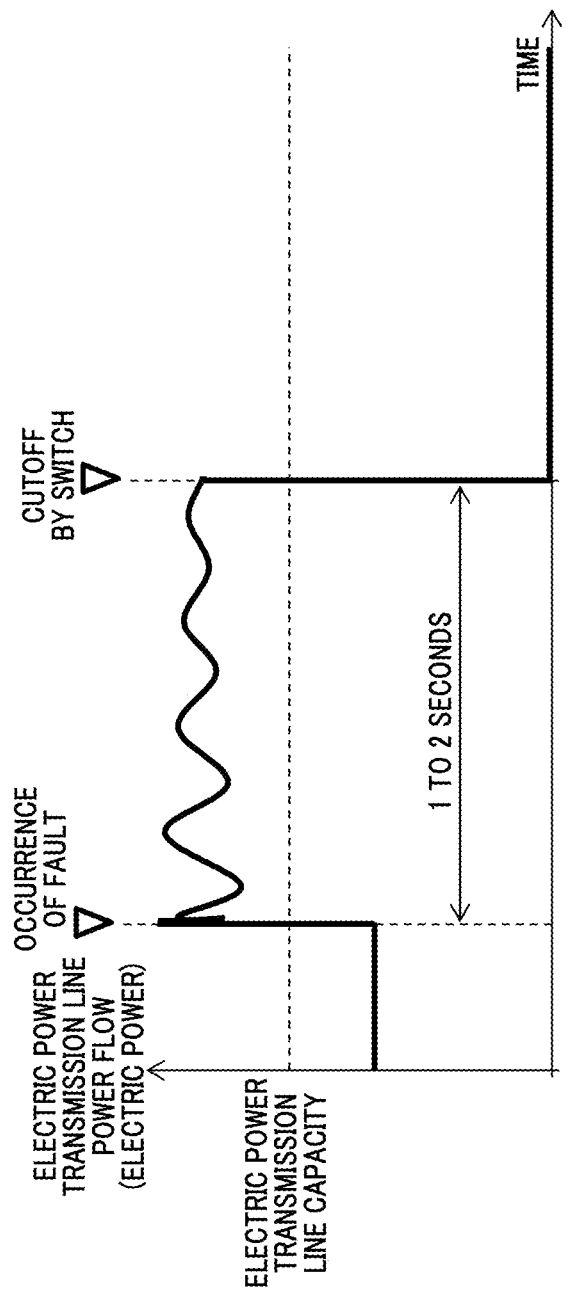
FIG. 2 shows an example of a response when a fault occurs on an electric power system 2.

FIG. 2 shows an example of a response at the time of a fault on the electric power system 2. The vertical axis indicates power flow in the electric power transmission line, i.e., electric power. The horizontal axis indicates time. In the example shown in FIG. 2, after a fault occurs, an output waveform of the electric power vibrates due to control of an electric power generator, and the like. In FIG. 2, the switch 16 cuts off the electric power system 2 within 1 to 2 seconds after a fault occurs.

When a fault occurs on the electric power system 2, it is necessary for the control apparatus 100 to parallel off the distributed power supply 10 from the electric power system 2 or to suppress an output of the distributed power supply 10 so as to appropriately manage the electric power transmission line. In general, the electric power system 2 is configured to maintain a voltage to an appropriate value by procuring the reactive electric power from the distributed power supply 10. Therefore, if all the distributed power supplies 10 are paralleled off, the reactive electric power is not provided, so that it is difficult to maintain a voltage to an appropriate value.

Further, when the number of the distributed power supplies 10 connected to the electric power system 2 is large, the electric power from the distributed power supply 10 occupies most of power flow that flows in the electric power transmission line. Therefore, when a fault occurs on the electric power system 2, it is important to manage power flow in the electric power transmission line and to suppress an output of the distributed power supply 10. When an output of the distributed power supply 10 is suppressed beyond necessity, it may have a consecutive effect on the electric power generation system.

When one electric power transmission line fault causes a voltage drop due to a decrease in reactive electric power and an excessive output suppression, it may lead to consecutive tripping of the electric power generation system, in some cases. Therefore, the control apparatus 100 is preferably configured to calculate an appropriate output suppression amount in each of the distributed power supplies 10 and an appropriate reactive electric power necessary to maintain a voltage in the electric power system 2.

In order for the control apparatus 100 to calculate an appropriate output suppression amount in each of the distributed power supplies 10 and an appropriate reactive electric power, the control apparatus 100 is preferably configured to execute optimal power flow calculation. On the other hand, considering an overcurrent tolerance time of the electric power transmission line, the appropriate output suppression amount and reactive electric power in the event of a fault are preferably acquired within a time period of 2 seconds or shorter, more preferably, 1 second or shorter after a fault occurs. However, it may take 2 seconds or longer after a calculation including the optimal power flow calculation starts until the calculation is completed.

The control apparatus 100 is configured to execute in advance a calculation including the optimal power flow calculation corresponding to a type of a virtual fault, at a fixed cycle. When a fault actually occurs, the control apparatus 100 selects a solution suitable for a type of the fault from solutions of optimization problems calculated in advance. Then, the control apparatus 100 outputs the selected solution as a command value. The solution of the optimization problem may include an output suppression amount ΔP and a reactive electric power Q. By the above procedure, it is possible to command the solution of the optimization problem, which would otherwise take a long time, as a command value.

As shown in FIG. 1, the control apparatus 100 comprises a first calculation unit 110 and a command output unit 120. The control apparatus 100 may further comprise a second calculation unit 130. The first calculation unit 110 is configured to calculate in advance reactive electric power to be output by each of the distributed power supplies 10 in the event of a fault on the electric power system 2. The first calculation unit 110 is configured to calculate in advance an output suppression amount of the active electric power to be suppressed by each of the distributed power supplies 10 in the event of a fault on the electric power system 2.

The command output unit 120 is configured to output, to each of the distributed power supplies 10, a command signal for causing each of the distributed power supplies 10 to output the reactive electric power calculated in advance by the first calculation unit 110 when it is detected that a fault has occurred on the electric power system 2. In the present example, the command signal may further include information according to the output suppression amount of the active electric power.

The second calculation unit 130 is configured to input, to the first calculation unit 110, system data including an electric power parameter at a plurality of nodes of the electric power system 2. For example, the second calculation unit 130 includes a data acquisition unit 132 and a data processing unit 134. The data acquisition unit 132 is configured to periodically acquire system data relating to the electric power system 2 to be evaluated. The system data includes an electric power parameter relating to a plurality of nodes, specifically, the distributed power supply 10 and the conventional power supply 20 of the electric power system 2. The electric power parameter includes at least one of a voltage, current, active electric power, and reactive electric power. For example, the electric power parameter includes a voltage, active electric power, and reactive electric power.

The data acquisition unit 132 may also be configured to acquire the electric power parameter from the electric power conversion apparatus 12 of each of the distributed power supplies 10 or to acquire the electric power parameter from other sensors. The system data may include fault information. The fault information may be information about characteristic values of a current and the like measured by the sensor unit 15-1 and the sensor unit 15-2. The data acquisition unit 132 may generate a fault detection trigger when the fault information is detected. The fault detection trigger may include information indicating that a fault has occurred, and information about a type of the fault.

The second calculation unit 130 is configured to acquire the system data for each predetermined cycle referred to as a sampling cycle. The sampling cycle is, for example, 2 seconds or shorter, more preferably, 1 second or shorter. The sampling cycle of the electric power parameter of the system data and the sampling cycle of the fault information may be different.

The data processing unit 134 is configured to process data acquired by the data acquisition unit 132. For example, the data processing unit 134 executes processing such as changing the data format, denoising, complementing and the like. The data processed by the data processing unit 134 is transferred to the first calculation unit 110, as the system data. The system data may include characteristic values such as active electric power P, reactive electric power Q, a voltage V, current I and the like.

The first calculation unit 110 includes, for example, a data complementing unit 111, an optimal power flow calculation unit 112, a storage unit 113, and a command value storage unit 114. When the electric power parameter at any node among the plurality of nodes cannot be acquired, the data complementing unit 111 complements missing data in the system data, based on the system data at another node or another time. Specifically, when the electric power parameter at any of the plurality of nodes cannot be acquired, missing data is caused in the system data at the corresponding node.

In this case, wide-area data processing may be executed. The wide-area data processing may be processing of calculating missing data at a specific time at the node, based on other system data that is spatially or temporally adjacent. For example, a state of missing data at the node may be estimated from the system data at one or a plurality of nodes that is spatially adjacent.

The optimal power flow calculation unit 112 is configured to execute optimal power flow (OPF) calculation. The operation of the electric power system 2 has a plurality of such operational constraints that a voltage value at each node, a power flow value in each electric power transmission line, and an output of each power supply should be kept within appropriate ranges. It is ideal to operate the electric power system 2 so as to optimize the purposes while satisfying all of the plurality of constraints. The optimal power flow (OPF) calculation determines an operating state (power flow section) that optimizes a predetermined purpose while satisfying various constraint conditions.

In the present example, the optimal power flow calculation unit 112 is configured to calculate in advance active electric power, reactive electric power, and a voltage to be output by each of the distributed power supplies 10 for each of two or more types of a fault A and a fault B on the electric power system 2. For example, the optimal power flow calculation unit 112 may calculate an output suppression amount, which is an amount of the active electric power to be suppressed by each of the distributed power supplies 10, and an output of the reactive electric power, in each operating state (power flow section) taking the two or more types of the fault A and the fault B on the electric power system 2 into consideration.

The optimal power flow calculation unit 112 may also be configured to calculate a command value set, which includes information on the reactive electric power to be output by each of the distributed power supplies 10 and information corresponding to the output suppression amount to be suppressed, for each assumed fault. The types of a fault may include a difference in the place of the disconnected electric power transmission line, a difference in the number of disconnected electric power transmission lines, and the like. The first calculation unit 110 may also be configured to calculate the output suppression amount of the active electric power, and the reactive electric power of each of the distributed power supplies 10 at normal times when a fault does not occur.

The storage unit 113 is configured to store in advance information necessary for the optimal power flow calculation unit 112 to calculate the optimal power flow. The storage unit 113 may also be configured to store in advance the information on the connection places of the plurality of nodes of the electric power system 2 in the electric power system, that is, the distributed power supply 10 and the conventional power supply 20, as necessary.

The command value storage unit 114 may be a database in which command value sets 115-1 and 115-2 of the output suppression amount of the active electric power, the reactive electric power and the like in each of the distributed power supplies 10 for each of the different types of the fault A and the fault B are stored. The command value storage unit 114 may also be configured to store a command value set 116 such as the output suppression amount of the active electric power, the output of the reactive electric power, and the like in each of the distributed power supplies 10 at normal times when a fault does not occur.

The first calculation unit 110 is configured to update the command values such as the reactive electric power to be output by the distributed power supply 10, the output suppression amount and the like, at a cycle longer than a data cycle of the system data, based on the system data. The data cycle of the system data may be a sampling cycle of data, and more specifically, may be a sampling cycle for which the second calculation unit 130 acquires the system data. Therefore, the update cycle of the command value by the first calculation unit 110 is longer than the sampling cycle of data by the second calculation unit 130. Therefore, the first calculation unit 110 functions as a long-cycle calculation unit, and the second calculation unit 130 functions as a short-cycle calculation unit.

The sampling cycle in the short-cycle calculation by the second calculation unit 130 may be 1 second to 2 seconds. The update cycle as a long-cycle calculation cycle by the first calculation unit 110 is 2 seconds or longer. The long-cycle calculation cycle may be, for example, 10 seconds, 1 minute, 10 minutes or 30 minutes. The long-cycle calculation cycle may be predetermined according to a degree of load variation or output variation of the electric power system 2 that is a target.

The command output unit 120 includes a selection unit 122 and a transmission unit 124. The command output unit 120 may also be an interrupt calculation unit configured to execute interrupt processing. The command output unit 120 is configured to receive a fault detection trigger, as interrupt information. The selection unit 122 is configured to select a command value set stored in the command value storage unit 114 according to the type of the fault that has occurred. When a fault A has occurred, the selection unit 122 selects the command value set 115-1 for each of the distributed power supplies 10 according to the fault A. Similarly, when the fault B has occurred, the selection unit 122 selects the command value set 115-2 for each of the distributed power supplies 10 according to the fault B.

The transmission unit 124 is configured to output a command signal based on a command value included in the command value set 115 selected by the selection unit 122 according to the type of the fault. The transmission unit 124 may also be configured to output a command signal including a value of reactive electric power to be output by each of the distributed power supplies 10 and an output suppression amount to be suppressed. The transmission unit 124 may also be further configured to output a command signal including the active electric power and the output suppression amount in each of the distributed power supplies 10 at normal times when a fault does not occur.

Figure 3:
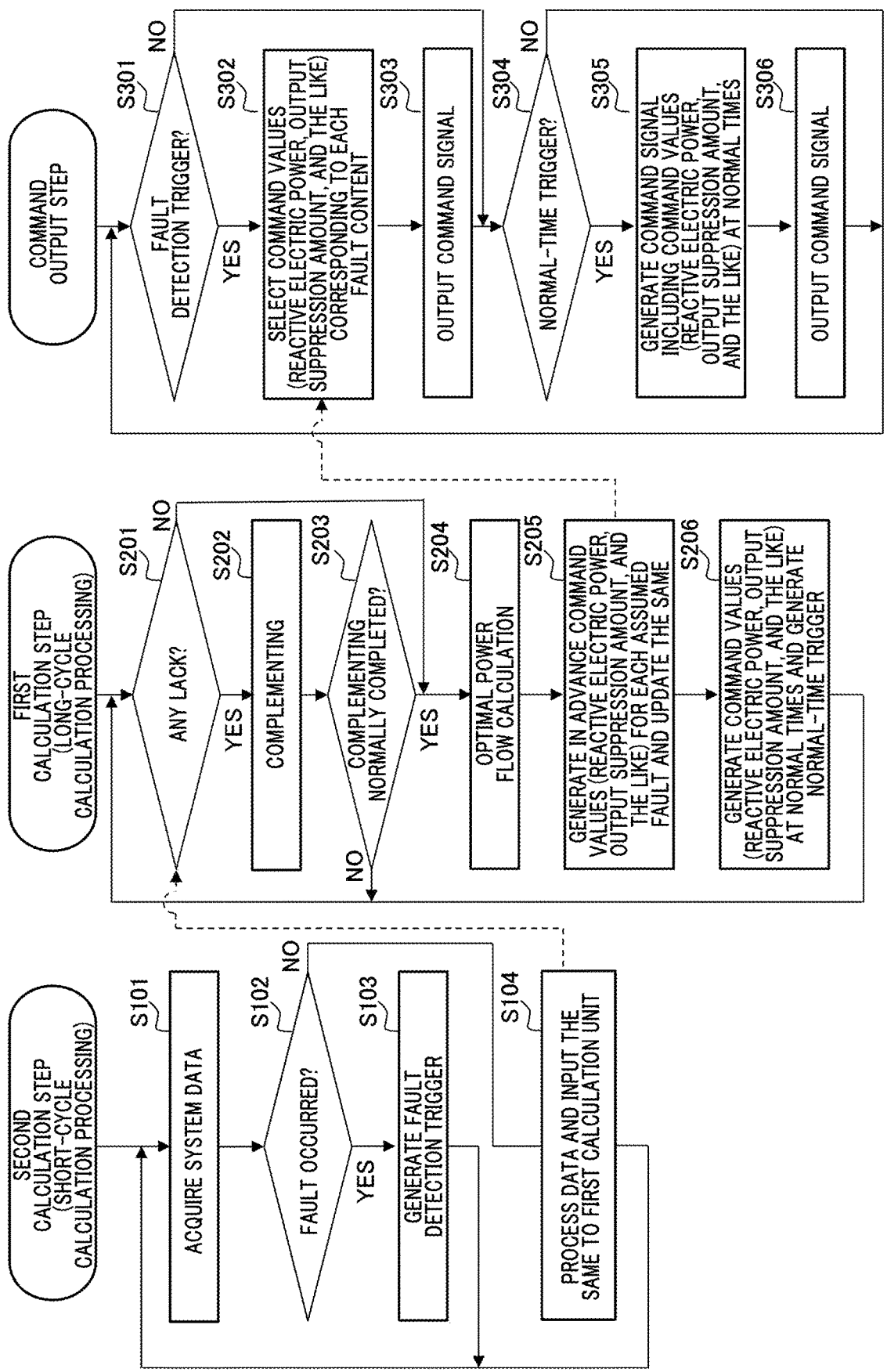
FIG. 3 is a flowchart showing an example of a control method according to an embodiment of the present invention.

FIG. 3 is a flowchart showing an example of a control method according to an embodiment of the present invention. First, a second calculation step by the second calculation unit 130 is described. The second calculation step is referred to as short-cycle calculation processing. The second calculation unit 130 periodically acquires system data relating to the electric power system 2 to be evaluated (step S101). The second calculation unit 130 detects a fault on the electric power system 2 based on whether there is fault information in the system data (step S102). When a fault has occurred on the electric power system 2 (step S102: YES), the second calculation unit 130 generates a fault detection trigger (step S103). The fault detection trigger may include information indicating that a fault has occurred, and information about a type of the fault.

When a fault has not occurred on the electric power system 2 (step S102: NO), the second calculation unit 130 processes data acquired by the data acquisition unit 132, as necessary (step S104). The second calculation unit 130 inputs, to the first calculation unit 110, system data including an electric power parameter at a plurality of nodes of the electric power system 2 (step S104). The nodes may include the plurality of distributed power supplies 10 and at least one conventional power supply 20. The second calculation unit 130 periodically repeats the processing from step S101 to step S104. The cycle is 2 seconds or shorter, and more preferably, 1 second or shorter.

Subsequently, long-cycle calculation processing that is a first calculation step by the first calculation unit 110 is described. The first calculation unit 110 acquires the system data from the second processing unit 130. When there is a lack in the system data due to inability to acquire the electric power parameter at any node among the plurality of nodes (step S201: YES), the first calculation unit 110 may complement the missing data in the system data by using system data that is temporally or spatially adjacent (step S202).

When the complementing cannot be normally completed (step S203: NO), the processing returns to step S201. The first calculation unit 110 newly acquires the system data from the second processing unit 130. Note that, the processing from step S201 to step S203 may be omitted. When there is a temporary lack in the system data, the processing may return to step S201 without performing the complementing processing (step S202). In this case, the first calculation unit 110 may be configured to wait for acquisition of new system data without any lack in time series before starting the processing.

The optimal power flow calculation unit 112 of the first calculation unit 110 executes the optimal power flow calculation (step S204). In the present example, the optimal power flow calculation unit 112 sets, as an evaluation function, a sum of electric power transmission loss at normal times, an output suppression amount at normal times, an output suppression amount at the time of a fault, an electric power deviation amount at normal times and an electric power deviation amount at the time of a fault. The optimal power flow calculation unit 112 calculates a solution that can minimize the evaluation function while satisfying the constraint conditions.

In the present example, the evaluation function is formulated as shown in the following equation (1). In the present example, as the evaluation function, the same function is used for normal times and for the time of a fault. As for the constraint conditions, different conditions are used for normal times and for the time of a fault. Note that, a dashed variable means a variable at the time of a fault.

[Formula 1]

$$\min_{P,Q,F^P,F^Q,F^{P'},F^{Q'},\theta,V,\theta',V',\Delta P,\Delta P',\delta} \sum_{i \in N} \left( \sum_{k \in g_i} P_k + \sum_{k \in D_i} \overline{P}_k - d_i^p + \sum_{k \in D_i} \Delta P_k + \sum_{k \in D_i} \Delta P'_k + \rho e^2 + \rho e'^2 \right) \quad \text{equation 1}$$

here,
N: node set
g: conventional power supply node set
$g_i \subseteq g$: conventional power supply set at node $i \in N$
D: distributed power supply node set
$D_i \subseteq D$: distributed power supply set at node $i \in N$
$P_i$: active electric power at node $i \in N$ at normal times
$\overline{P}_i$: active electric power at distributed power supply node $i \in D_i$ at normal times $$\sum_{k \in g_i} P_k :$$

sum of active electric power at conventional power supply node at normal times $$\sum_{k \in D_i} \overline{P}_k :$$

sum of predicted active electric power values at distributed power supply node at normal times
$d_i^P$: active electric power load at node $i \in N$ at normal times $$\sum_{k \in D_i} P_k + \sum_{k \in D_i} \overline{P}_k - d_i^p :$$

electric power transmission loss at normal times
$\Delta P_i$: output suppression amount at distributed power supply node $i \in D_i$ at normal times
$\Delta P_i'$: output suppression amount at distributed power supply node $i \in D_i$ at the time of a fault $$\sum_{k \in D_i} \Delta P_k :$$

sum of output suppression amounts at distributed power supply node at normal times $$\sum_{k \in D_i} \Delta P'_k :$$

sum of output suppression amounts at distributed power supply node at the time of a fault
e: voltage deviation amount at normal times
e': voltage deviation amount at the time of a fault
ρ: voltage deviation amount penalty
$\rho e^2$: electric power deviation amount at normal times
$\rho e'^2$: electric power deviation amount at the time of a fault In the present example, as equality constraints at normal times, a demand-and-supply balance relational expression for considering a demand-and-supply balance and a power flow equation are considered. The demand-and-supply balance relational expression is expressed by an equation (2-1) and an equation (2-2) as follows.

[Formula 2]

Constraints at normal times $\quad$ equation (2-1)

Demand-and-supply balance constraint $$\sum_{k \in g_i} P_k + \sum_{k \in D_i} \overline{P}_k - \sum_{k \in D_i} \Delta P_k - \sum_{(jc): ijc \in \varepsilon} F^P_{ijc} - \sum_{(jc): jic \in \varepsilon} F^P_{ijc} - d_i^p - (V_i)^2 g_i^s = 0, \forall i \in N$$

$$\sum_{k \in g_i} Q_k + \sum_{k \in D_i} Q_k \sum_{(jc): ijc \in \varepsilon} F^Q_{ijc} - \quad \text{equation (2-2)}$$

$$\sum_{(jc): jic \in \varepsilon} F^Q_{ijc} - d_i^Q + (V_i)^2 b_i^s = 0, \forall i \in N$$

here, C∈C: node point set ε⊆N×N×C: branch set $F_{ijc}^P$ :

active electric power at branch $ijc \in \varepsilon$ at normal times $\sum_{(jc):ijc\in\varepsilon} F_{ijc}^P$ :

active electric power transmitted from i to j at node point jc $\sum_{(jc):jic\in\varepsilon} F_{ijc}^P$ :

active electric power transmitted from j to i at node point jc
$V_i$: voltage amplitude at node $i \in N$ at normal times
$g_i^S$: shunt conductance at node $i \in N$
$Q_i$: reactive electric power at node $i \in N$ at normal times $\sum_{k\in g_i} Q_k$ :

sum of reactive electric power at conventional power supply node $i \in g_i$ at normal times $\sum_{k\in D_i} Q_k$ :

sum of reactive electric power at conventional power supply node $i \in g_i$ at normal times
$F_{ijc}^Q$: reactive electric power at branch $ijc \in \varepsilon$ at normal times $\sum_{(jc):ijc\in\varepsilon} F_{ijc}^Q$ :

reactive electric power transmitted from i to j at node point jc $\sum_{(jc):ijc\in\varepsilon} F_{ijc}^Q$ :

reactive electric power transmitted from i to j at node point jc
$d_i^Q$: reactive electric power load at node $i \in N$ at normal times
$b_i^S$: susceptance at node $i \in N$ Note that, in the equation (2-1) and the equation (2-2), a branch set E means a set (c, i, j) of two branches (i, j) directly connected to a node point c. $V_i$ and $V_j$ indicate voltages of node i and node j of the branches directly connected to the node point c. Shunt conductance and susceptance mean adjustable RL elements (resistor, inductance component) connected to a node. For example, the RL element may mean a phase adjusting facility provided for an electric power substation and the like.

The power flow equation is expressed by an equation (3-1), an equation (3-2), an equation (3-3), and an equation (3-4) as follows.

[Formula 3]

Power flow equation $$F_{ijc}^P = \frac{1}{T_{ijc}^2}g_{ijc}^\varepsilon V_i^2 - \qquad \text{equation (3-1)}$$
$$\frac{1}{\tau_{ijc}}V_i V_j\left(g_{ijc}^\varepsilon \cos(\theta_i - \theta_j) + b_{ijc}^\varepsilon \sin(\theta_i - \theta_j)\right), \forall ijc \in \varepsilon$$

$$F_{jic}^P = g_{ijc}^\varepsilon V_j^2 - \qquad \text{equation (3-2)}$$
$$\frac{1}{\tau_{ijc}}V_i V_j\left(g_{ijc}^\varepsilon \cos(\theta_j - \theta_i) + b_{ijc}^\varepsilon \sin(\theta_j - \theta_i)\right), \forall ijc \in \varepsilon$$

$$F_{ijc}^Q = -\frac{1}{\tau_{ijc}^2}\left(b_{ijc}^\varepsilon + \frac{b_{ijc}^C}{2}\right)V_i^2 - \qquad \text{equation (3-3)}$$
$$\frac{1}{\tau_{ijc}}V_i V_j\left(g_{ijc}^\varepsilon \cos(\theta_i - \theta_j) - b_{ijc}^\varepsilon \sin(\theta_i - \theta_j)\right), \forall ijc \in \varepsilon$$

$$F_{jic}^P = -\left(b_{ijc}^\varepsilon + \frac{b_{ijc}^C}{2}\right)V_i^2 - \qquad \text{equation (3-4)}$$
$$\frac{1}{\tau_{ijc}}V_i V_j\left(g_{ijc}^\varepsilon \cos(\theta_j - \theta_i) - b_{ijc}^\varepsilon \sin(\theta_j - \theta_i)\right), \forall ijc \in \varepsilon$$

here,
$\tau_{ijc}$: transformer tap value branch $ijc \in \varepsilon$
$g_{ijc}^\varepsilon$: conductance at branch $ijc \in \varepsilon$
$\theta_i$, $\theta_j$: voltage phase at node i, $j \in N$ at normal times
$b_{ijc}^\varepsilon$: susceptance at branch $ijc \in \varepsilon$
$b_{ijc}^C$: branch charging susceptance at branch $ijc \in \varepsilon$ Note that, at each node i, a case where electric power comes out from an own node i to another node j is shown by the equation (3-1) and the equation (3-3), and a case where electric power comes in from another node j to an own node i is shown by the equation (3-2) and the equation (3-4). Note that, conductance and susceptance at the branch ijc are RL elements existing in the electric power transmission line, and numerically indicate, for example, a resistance and an inductance component of the electric power transmission line. The branch charging susceptance at the branch ijc indicates a capacitor (C) element existing in the electric power transmission line.

As inequality constraints at normal times, upper and lower limits of each variable, upper and lower limits of an electric power generator output and operational constraint conditions may be set. In the present example, an electric power transmission line capacity constraint, a voltage constraint, an active electric power constraint of the distributed power supply 10, an active electric power constraint of the output suppression amount, a reactive electric power constraint of the distributed power supply 10, and an apparent electric power constraint of the distributed power supply 10 are considered. The electric power transmission line capacity constraint is expressed by the following equation (4). The voltage constraint is expressed by the following equation (5). The active electric power constraint of the distributed power supply 10 is expressed by the following equation (6). The active electric power constraint of the output suppression amount is expressed by the following equation (7). The reactive electric power constraint of the distributed power supply 10 is expressed by the following equation (8). The apparent electric power constraint of the distributed power supply 10 is expressed by the following equation (9).

[Formula 4]

Constraints at Normal Times

Inequality Constraint

Electric power transmission line capacity constraint $$-\overline{F}_{ijc}^{P} \leq F_{ijc}^{P} \leq \overline{F}_{ijc}^{P}, \forall ijc \in \varepsilon \quad \text{equation (4)}$$

here, $F_{ijc}^{P}$: upper limit of active electric power at branch $ijc \in \varepsilon$ Voltage Constraint:

$$V_{Li} - e \leq V_i \leq V_{Ui} + e, \forall i \in \mathcal{N} \quad \text{equation (5)}$$

here, $V_{Li}$, $V_{Ui}$: lower limit and upper limit of voltage amplitude at node $i \in N$ Active electric power constraint of distributed power supply $$P_{Li} \leq \overline{P}_i - \Delta P_i \leq P_{Ui}, \forall i \in \mathcal{D} \quad \text{equation (6)}$$

here, $P_{Li}$, $P_{Ui}$: lower limit and upper limit of active electric power at power supply $i \in DUg$ Active electric power constraint of output suppression amount (which does not exceed original output)

$$0 \leq \Delta P_i \leq \overline{P}_i, \forall i \in \mathcal{D} \quad \text{equation (7)}$$

Reactive electric power constraint of distributed power supply $$Q_{Li} \leq Q_i \leq Q_{Ui}, \forall i \in \mathcal{D} \quad \text{equation (8)}$$

here, $Q_{Li}$, $Q_{Ui}$: lower limit and upper limit of reactive electric power at power supply $i \in DUg$ Apparent electric power constraint of distributed power supply $$(\overline{P}_i - \Delta P_i)^2 + Q_i^2 \leq S_i^2, \forall i \in \mathcal{D} \quad \text{equation (9)}$$

here, $S_i$: upper limit of apparent electric power

On the other hand, as the equality constraints at the time of each fault, the demand-and-supply balance relational expression for considering the demand-and-supply balance, and the power flow equation are considered, as follows.

The demand-and-supply balance relational expression for considering the demand-and-supply balance is expressed by an equation (10-1) and an equation (10-2), as follows.

[Formula 5]

Contraints at the time of each fault

Demand-and-supply balance constraint $$\sum_{k \in \mathcal{G}_i} P_k + \sum_{k \in \mathcal{D}_i} \overline{P}_k - \sum_{k \in \mathcal{D}_i} \Delta P_k - \sum_{k \in \mathcal{D}_i} \Delta P'_k -$$

$$\sum_{(jc):ijc \in \varepsilon} F_{ijc}^{P'} - \sum_{(jc):jic \in \varepsilon} F_{ijc}^{P'} - d_i^{P'} - (V_i')^2 g_i^s = 0, \forall i \in \mathcal{N}$$

$$\sum_{k \in \mathcal{G}_i} Q'_k + \sum_{k \in \mathcal{D}_i} Q'_k - \sum_{(jc):ijc \in \mathcal{N}} F_{ijc}^{Q'} - \quad \text{equation (10-2)}$$

$$\sum_{(jc):jic \in \varepsilon} F_{ijc}^{Q'} - d_i^{Q'} + (V_i')^2 b_i^s = 0, \forall i \in \mathcal{N}$$

here, $$\sum_{k \in \mathcal{D}_i} \Delta P_k :$$

output constraint at normal times $$\sum_{k \in \mathcal{D}_i} \Delta P'_k :$$

output constraint at the time of a fault $F_{ijc}^{P'}$: active electric power at branch $ijc \in \varepsilon$ at the time of a fault $$\sum_{(jc):ijc \in \varepsilon} F_{ijc}^{P'}$$

active electric power transmitted from i to j at node point jc at the time of a fault $$\sum_{(jc):jic \in \varepsilon} F_{ijc}^{P'} :$$

active electric power transmitted from i to j at node point jc at the time of a fault $d_i^{P'}$: active electric power load at node $i \in N$ at the time of a fault $V_i'$: voltage amplitude at node $i \in N$ at normal times $Q_k'$: reactive electric power load at node $i \in N$ at the time of a fault $$\sum_{k \in g_i} Q'_k :$$

sum of reactive electric power at conventional power supply node $i \in$
$g_i$ at the time of a fault $$\sum_{k \in \mathcal{D}_i} Q'_k$$

sum of reactive electric power at distributed power supply node $i \in$
$g_i$ at the time of a fault $F_{ijc}^{Q'}$: reactive electric power at branch $ijc \in \varepsilon$ at normal times $$\sum_{(jc):ijc \in \varepsilon} F_{ijc}^{Q'} :$$

reactive electric power transmitted from i to j at node point jc at the time of a fault $$\sum_{(jc):jic \in \varepsilon} F_{ijc}^{Q'} :$$

reactive electric power transmitted from j to i at node point jc at the time of a fault $d_i^{Q'}$: reactive electric power load at node $i \in N$ at the time of a fault The power flow equation at the time of a fault is expressed by an equation (11-1), an equation (11-2), an equation (11-3), and an equation (11-4), as follows.

[Formula 6]

Contraint at the time of a fault  equation (11-1)

Power flow equation $$F_{ijc}^{P\prime} = \frac{1}{\tau_{ijc}^2} g_{ijc}^{\varepsilon\prime} V_i^{\prime 2} -$$
$$\frac{1}{\tau_{ijc}} V_i^\prime V_j^\prime \left( g_{ijc}^{\varepsilon\prime} \cos(\theta_i^\prime - \theta_j^\prime) + b_{ijc}^{\varepsilon\prime} \sin(\theta_i^\prime - \theta_j^\prime) \right), \forall ijc \in \varepsilon$$

$$F_{ijc}^{P\prime} = g_{ijc}^{\varepsilon\prime} V_j^{\prime 2} - \frac{1}{\tau_{ijc}} V_i^\prime V_j^\prime \left( g_{ijc}^{\varepsilon\prime} \cos(\theta_i^\prime - \theta_j^\prime) + b_{ijc}^{\varepsilon\prime} \sin(\theta_i^\prime - \theta_j^\prime) \right),$$ equation (11-2)

$$\forall ijc \in \varepsilon$$

$$F_{ijc}^{Q\prime} = -\frac{1}{\tau_{ijc}^2} \left( b_{ijc}^{\varepsilon\prime} + \frac{b_{ijc}^{C\prime}}{2} \right) V_i^{\prime 2} -$$ equation (11-3)
$$\frac{1}{\tau_{ijc}} V_i^\prime V_j^\prime \left( g_{ijc}^{\varepsilon\prime} \cos(\theta_i^\prime - \theta_j^\prime) - b_{ijc}^{\varepsilon\prime} \sin(\theta_i^\prime - \theta_j^\prime) \right), \forall ijc \in \varepsilon$$

$$F_{jic}^{Q\prime} = -\left( b_{ijc}^\prime + \frac{b_{ijc}^{C\prime}}{2} \right) V_j^{\prime 2} -$$ equation (11-4)
$$\frac{1}{\tau_{ijc}} V_i^\prime V_j^\prime \left( g_{ijc}^{\varepsilon\prime} \cos(\theta_i^\prime - \theta_j^\prime) - b_{ijc}^{\varepsilon\prime} \sin(\theta_i^\prime - \theta_j^\prime) \right), \forall ijc \in \varepsilon$$

here, $T_{ijc}$: transformer tap value at branch $ijc \in \varepsilon$
$g_{ijc}^{\varepsilon\prime}$: conductance at branch $ijc \in \varepsilon$ at the time of a fault
$\theta_i^\prime, \theta_j^\prime$: voltage phase at node $i, j \in N$ at the time of a fault
$b_{ijc}^{\varepsilon\prime}$: susceptance at branch $ijc \in \varepsilon$ at the time of a fault
$b_{ijc}^{\varepsilon\prime}$: branch charging susceptance at branch $ijc \in \varepsilon$ at the time of a fault As the inequality constraints at the time of a fault, upper and lower limits of each variable, upper and lower limits of an electric power generator output and operational constraint conditions may be set. In the present example, an equation (12) that indicates the electric power transmission line capacity constraint, an equation (13) that indicates the voltage constraint, an equation (14) that indicates a constraint of the output suppression amount of the distributed power supply 10, an equation (15) that indicates the reactive electric power constraint of the distributed power supply 10, and an equation (16) that indicates the apparent electric power constraint of the distributed power supply 10 may be considered. Note that, when a node i is paralleled off, the upper limit and the lower limit of each inequality expression become zero. Therefore, the active electric power and the reactive electric power that are output from the paralleled-off distributed power supply 10 also become zero.

[Formula 7]
Constraints at the Time of a Fault
Inequality Constraint
Electric Power Transmission Line Capacity Constraint $$-\overline{F}_{ijc}^P \leq F_{ijc}^{P\prime} \leq \overline{F}_{ijc}^P, \forall ijc \in \varepsilon$$ equation (12)

here, $\overline{F}_{ijc}^P$: upper limit of active electric power at branch $ijc \in \varepsilon$
Voltage constraint at the time of a fault:

$$V_{Li} - e^\prime \leq V_i^\prime \leq V_{Ui} + e^\prime, \forall i \in \mathcal{N}$$ equation (13)

here, $V_{Li}, V_{Ui}$: lower limit and upper limit of voltage amplitude at node $i \in N$ Constraint of output suppression amount of distributed power supply (0: parallel off, 1: no parallel off)

$$P_{Li} S_i \leq \overline{P}_i - \Delta P_i^\prime \leq P_{Ui} \delta_i, \forall i \in \mathcal{D} \quad \delta_i \in \{0,1\}, \forall i \in \mathcal{D}$$ equation (14)

Reactive electric power constraint of distributed power supply (0: parallel off, 1: no parallel off)

$$Q_{Li} \delta_i \leq Q_i \leq Q_{Ui} \delta_i, \forall i \in \mathcal{D} \quad \delta_i \in \{0,1\}, \forall i \in \mathcal{D}$$ equation (15)

here,
$Q_{Li}, Q_{Ui}$: lower limit and upper limit of reactive electric power at power supply $i \in DUg$
Apparent electric power constraint of distributed power supply $$(\overline{P}_i - \Delta P_i - \Delta P_i^\prime)^2 + Q_i^{\prime 2} \leq S_i^2, \forall i \in \mathcal{D}$$ equation (16)

here, $S_i$: upper limit of apparent electric power

The optimal power flow calculation by the equation (1) and the equations (10-1) to (16) is executed in advance for each assumed fault. When a disconnection of the electric power transmission line (L patterns) and a power supply failure (M patterns) are assumed as the assumed fault, the optimal power flow calculation may be executed in advance for each fault of N(=L+M) patterns.

In FIG. 3, the first calculation unit 110 executes the optimal power flow calculation. The first calculation unit 110 generates in advance the reactive electric power and the output suppression amount as the command values for each assumed fault by the optimal power flow calculation, and periodically updates the same (step S205). In addition, in the present example, the first calculation unit 110 executes the optimal power flow calculation at normal times by using the equation (1) to the equation (9). The first calculation unit 110 generates the reactive electric power and the output suppression amount as the command values at normal times. The first calculation unit 110 generates a normal-time trigger to indicate that the command values at normal times have been generated (step S206).

Note that, the first calculation unit 110 preferably periodically calculates in advance the output suppression amount and the reactive electric power for each assumed fault by using the optimal power flow (OPF) calculation, and the evaluation functions, the equality constraints and the inequality constraints are not limited to the equations expressed by the equation (1) to the equation (16).

Subsequently, a command output step by the command output unit 120 is described. The command output unit 120 receives a fault detection trigger, thereby detecting that a fault has occurred on the electric power system 2. When the command output unit 120 receives the fault detection trigger (step S301: YES), the selection unit 122 selects the reactive electric power, the output suppression amount and the like, which correspond to the detected fault content, from the reactive electric powers and the output suppression amounts that are the command values calculated in advance for each fault by the first calculation unit 110 (step S302).

The transmission unit 124 transmits a command signal to each of the distributed power supplies 10. The command signal that is transmitted from the command output unit 120 may include information for causing each of the distributed power supplies 10 to output the reactive electric power calculated in advance, together with information corresponding to the output suppression amount calculated in advance.

In the present example, the command output unit 120 determines whether the normal-time trigger is received (step S304: YES). When the command output unit 120 receives the normal-time trigger (step S304: YES), the command output unit 120 generates a command signal including the information about the reactive electric power and the output suppression amount that are the command values at normal times (step S305). Then, the transmission unit 124 transmits the command signal including the command values at normal times to each of the distributed power supplies 10 (step S306).

Figure 4:
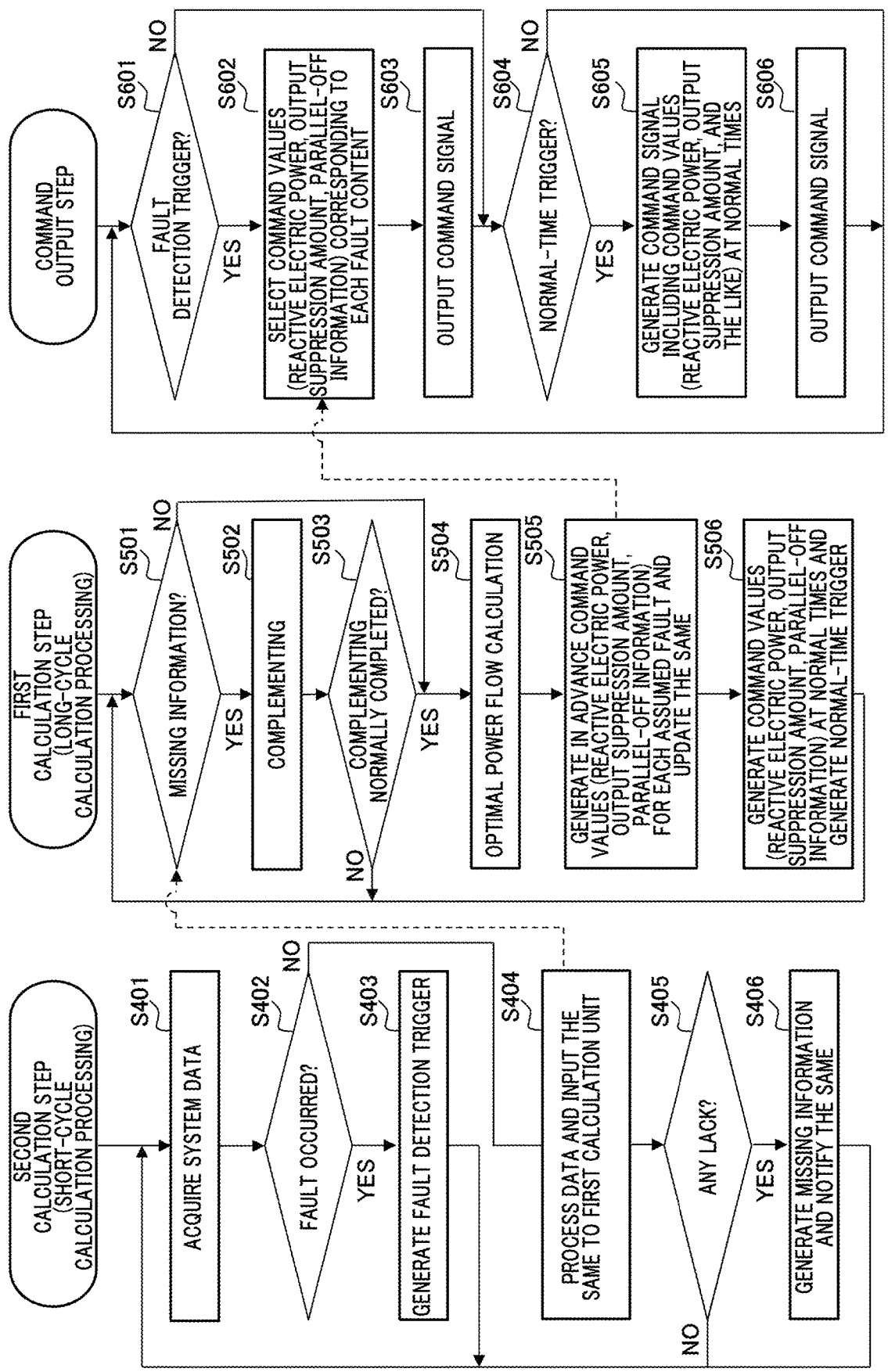
FIG. 4 is a flowchart showing another example of the control method according to the embodiment of the present invention.

FIG. 4 is a flowchart showing another example of the control method according to the embodiment of the present invention. Step S401 to step S404 are similar to step S101 to step S104 shown in FIG. 3. In the present example, in the second calculation step, when the electric power parameter at any node among the plurality of nodes cannot be acquired, the second calculation unit 130 generates missing information indicating that there is missing data (step S406). For example, the data processing unit 134 may generate the missing information indicating that there is missing data. The second calculation unit 130 notifies the missing information to the first calculation unit 110 (step 406).

The first calculation unit 110 determines in the first calculation step whether the missing information is received (step S501). When the missing information is received (step S501: YES), the first calculation unit 110 complements the missing data in the system data (step S502). Thereafter, the processing of step S503 to step S506 and step S601 to step S606 is similar to the processing of step S203 to step S206 and step S301 to step S306 shown in FIG. 3. Therefore, the overlapping descriptions are omitted.

In FIGS. 3 and 4, the cases where the control apparatus 100 outputs the command signal including the information for causing the distributed power supplies 10-1 and 10-2 to output the reactive electric power calculated in advance and the information corresponding to the output suppression amount calculated in advance have been described. The present invention is not limited thereto.

Figure 5:
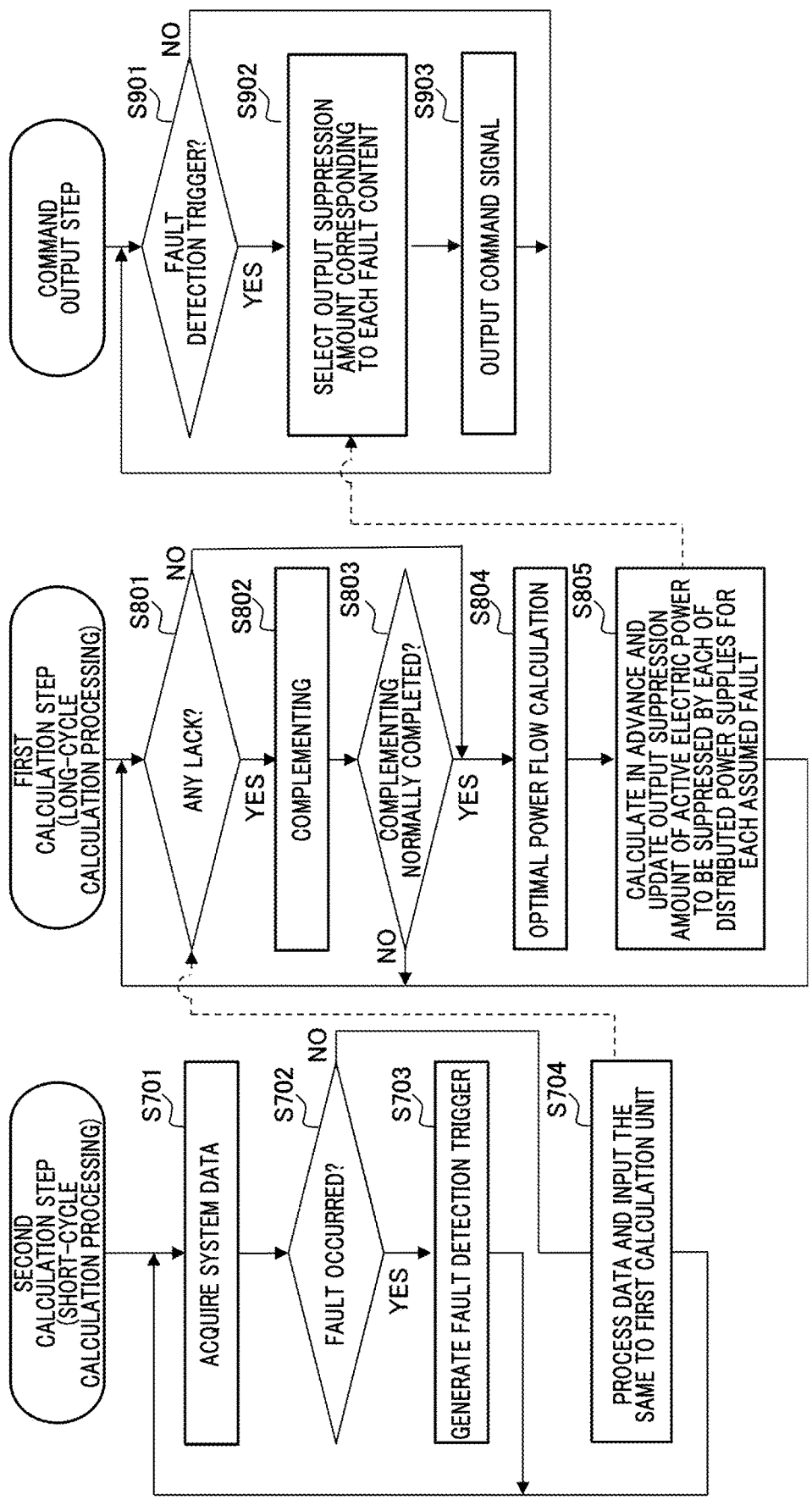
FIG. 5 is a flowchart showing another example of the control method according to the embodiment of the present invention.

FIG. 5 is a flowchart showing another example of the control method according to the embodiment of the present invention. The processing of step S701 to step S704 and step S801 to step S803 is similar to the processing of step S101 to step S104 and step S201 to step 203 shown in FIG. 3. Therefore, the overlapping descriptions are omitted.

The first calculation unit 110 executes the optimal power flow calculation in step S804. However, in the present embodiment, the first calculation unit 110 calculates in advance the output suppression amount in each of the distributed power supplies 10 in the event of a fault on the electric power system 2 (step S805). The output suppression amount is calculated for each assumed fault. The output suppression amount is periodically calculated and updated.

When the command output unit 120 receives the fault detection trigger (step S901: YES), the selection unit 122 selects a value of the output suppression amount, which corresponds to the detected fault content, from the values of the output suppression amount calculated in advance for each fault by the first calculation unit 110 (step S902). The transmission unit 124 of the command output unit 120 outputs a command signal, which includes the information corresponding to the output suppression amount in each of the distributed power supplies 10, to each of the distributed power supplies 10 (step S903).

Figure 6:
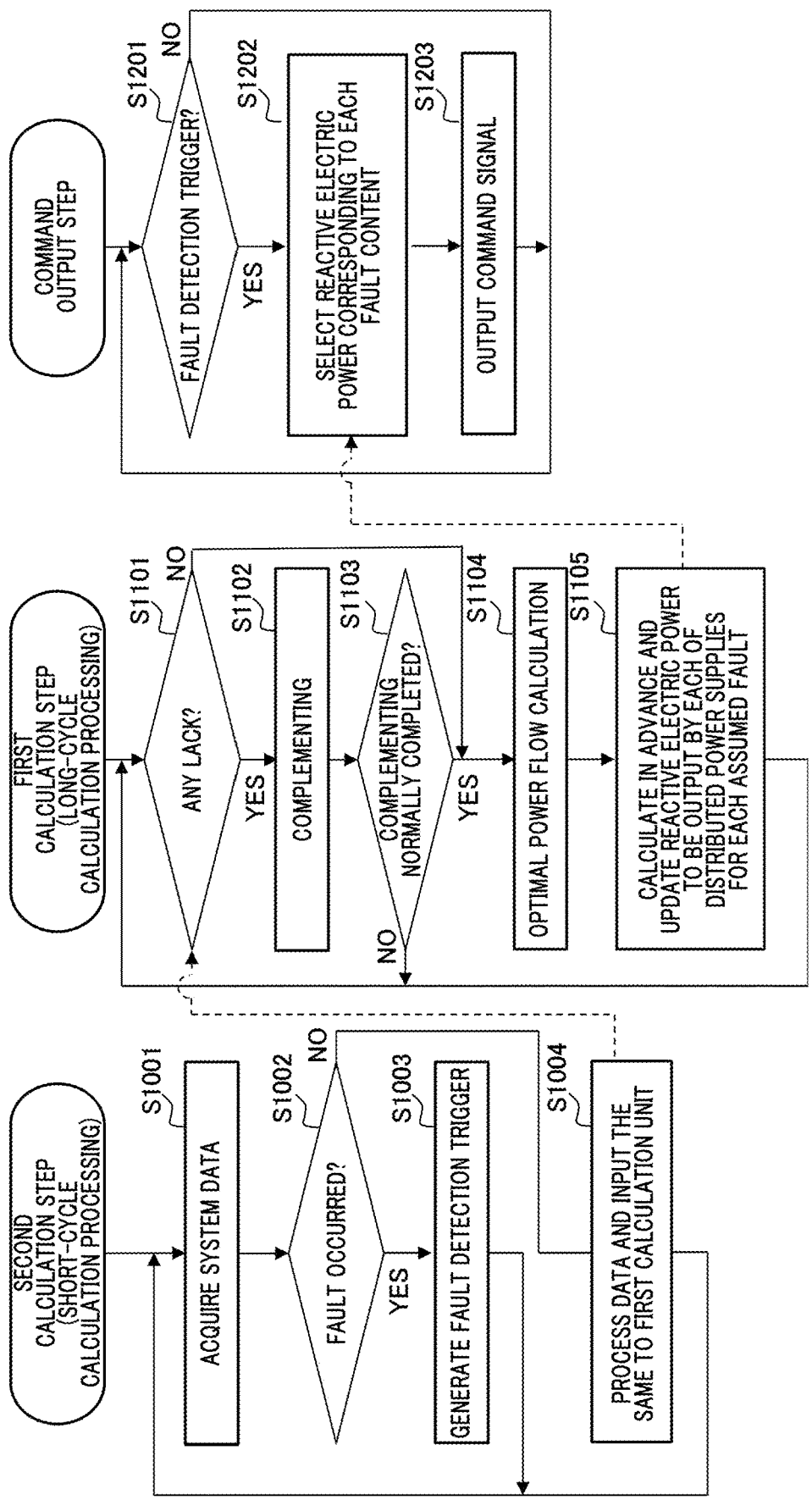
FIG. 6 is a flowchart showing another example of the control method according to the embodiment of the present invention.

FIG. 6 is a flowchart showing another example of the control method according to the embodiment of the present invention. The processing shown in FIG. 6 is similar to the processing shown in FIG. 5, except that the processing of step S804 and S805 shown in FIG. 5 is replaced with the processing of step S1104 and S1105 and the processing of step S902 is replaced with the processing of step S1202. Specifically, the processing of step S1001 to step S1004 shown in FIG. 6, the processing of step S1101 to step S1103 and the processing of step S1201 and step S1203 are similar to the processing of step S701 to step S704 shown in FIG. 5, the processing of step S801 to step S803 and the processing of step S901 and step S903. Therefore, the detailed descriptions are omitted.

The first calculation unit 110 executes the optimal power flow calculation in step S1104. However, in the present embodiment, the first calculation unit 110 calculates in advance the reactive electric power to be output by each of the distributed power supplies 10 in the event of a fault on the electric power system 2 (step S1105). The value of the reactive electric power is calculated for each assumed fault. The value of the reactive electric power is periodically calculated and updated.

When the command output unit 120 receives the fault detection trigger (step S1201: YES), the selection unit 122 selects a value of the reactive electric power, which corresponds to the detected fault content, from the values of the reactive electric power calculated in advance for each fault by the first calculation unit 110 (step S1202). The transmission unit 124 of the command output unit 120 outputs, to each of the distributed power supplies 10, a command signal for causing each of the distributed power supplies 10 to output the reactive electric power calculated in advance (step S1203).

As shown in FIG. 5 or 6, any one of the reactive electric power and the output suppression amount in each of the distributed power supplies 10 may be periodically updated in advance using the optimal power flow calculation, and when a fault occurs, the command signal including information of any one of the reactive electric power and the output suppression amount periodically updated may be output to each of the distributed power supplies 10.

As described above, according to the control apparatus 100 of the present embodiment, it is possible to calculate in advance the value of the appropriate reactive electric power in each of the distributed power supplies 10 by executing the optimal power flow calculation according to the assumed fault. Therefore, it is possible to prevent in advance a voltage drop due to a decrease in reactive electric power.

Further, according to the control apparatus 100 of the present embodiment, it is possible to calculate in advance the appropriate active electric power or the output suppression amount of the active electric power in each of the distributed power supplies 10 by executing the optimal power flow calculation according to the assumed fault. Therefore, it is possible to prevent a consecutive effect on the electric power generation system as a result of the output of the distributed power supply 10 being suppressed beyond necessity.

According to the control apparatus 100 of the present embodiment, instead of starting the time-consuming optimal power flow calculation after a fault occurs, the optimal power flow calculation is periodically executed in advance. Therefore, it is possible to acquire the appropriate output suppression amount and reactive electric power at the time of a fault within 2 seconds or shorter after the fault occurs. For this reason, according to the control apparatus 100 of the embodiment, when a fault occurs, it is possible to transmit the appropriate command signal to each of the distributed power supplies 10 at an early stage. Therefore, it is possible to start the appropriate control without exceeding the overcurrent tolerance time of the electric power transmission line.

According to the control apparatus 100 of the present embodiment, while it is possible to detect a fault at an early stage without lengthening the sampling cycle, it is possible to lengthen the update cycle by pre-calculation of the reactive electric power and the output suppression amount by the optimal power flow calculation.

Figure 7:
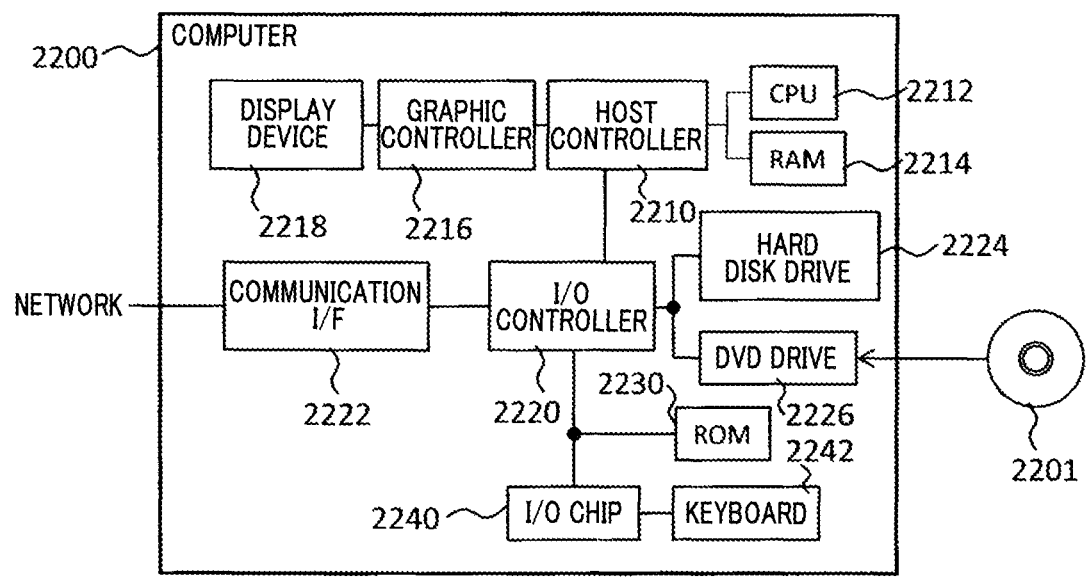
FIG. 7 shows an example of a computer 2200 in which a plurality of aspects of the present invention may be entirely or partially implemented.

FIG. 7 shows an example of a computer 2200 in which a plurality of aspects of the present invention may be entirely or partially implemented. A program that is installed in the computer 2200 can cause the computer 2200 to function as or execute operations associated with the apparatus of the embodiment of the present invention or one or more sections thereof, and/or cause the computer 2200 to execute the method of the embodiment of the present invention or steps thereof. Such program may be executed by a CPU 2212 so as to cause the computer 2200 to execute certain operations associated with some or all of the blocks of flowcharts and block diagrams described herein.

The computer 2200 in accordance with the present embodiment includes a CPU 2212, a RAM 2214, a graphic controller 2216 and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 is configured to operate according to programs stored in the ROM 2230 and the RAM 2214, thereby controlling each unit. The graphic controller 2216 is configured to acquire image data generated by the CPU 2212 on a frame buffer or the like provided in the RAM 2214 or in itself, and to cause the image data to be displayed on the display device 2218.

The communication interface 2222 is configured to communicate with other electronic devices via a network. The hard disk drive 2224 is configured to store programs and data used by the CPU 2212 within the computer 2200. The DVD-ROM drive 2226 is configured to read the programs or the data from the DVD-ROM 2201, and to provide the hard disk drive 2224 with the programs or the data via the RAM 2214. The IC card drive is configured to read programs and data from an IC card, and/or to write programs and data into the IC card.

The ROM 2230 is configured to store therein a boot program or the like that is executed by the computer 2200 at the time of activation, and/or a program depending on the hardware of the computer 2200. The input/output chip 2240 may also be configured to connect various input/output units to the input/output controller 2220 via a parallel port, a serial port, a keyboard port, a mouse port and the like.

A program is provided by a computer-readable medium such as the DVD-ROM 2201 or the IC card. The program is read from the computer-readable medium, is installed into the hard disk drive 2224, the RAM 2214 or the ROM 2230, which are also examples of the computer-readable medium, and is executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffer processing region provided in a recording medium such as the RAM 2214, the hard disk drive 2224, the DVD-ROM 2201, or the IC card, and transmits the read transmission data to a network or writes reception data received from a network to a reception buffer processing region or the like provided on the recording medium.

In addition, the CPU 2212 may be configured to cause all or a necessary portion of a file or a database, which has been stored in an external recording medium such as the hard disk drive 2224, the DVD-ROM drive 2226 (DVD-ROM 2201), the IC card and the like, to be read into the RAM 2214, thereby executing various types of processing on the data on the RAM 2214. The CPU 2212 is configured to write back the processed data to the external recording medium.

Various types of information, such as various types of programs, data, tables, and databases, may be stored in the recording medium to undergo information processing. The CPU 2212 may also be configured to execute various types of processing on the data read from the RAM 2214, which includes various types of operations, processing of information, condition judging, conditional branching, unconditional branching, search/replacement of information and the like described in the present disclosure and designated by an instruction sequence of programs, and to write the result back to the RAM 2214. The CPU 2212 may also be configured to search for information in a file, a database, etc., in the recording medium. For example, when a plurality of entries, each having an attribute value of a first attribute associated with an attribute value of a second attribute, is stored in the recording medium, the CPU 2212 may search for an entry matching the condition whose attribute value of the first attribute is designated, from the plurality of entries, and read the attribute value of the second attribute stored in the entry, thereby obtaining the attribute value of the second attribute associated with the first attribute satisfying the predetermined condition.

The above-described program or software modules may be stored in the computer-readable medium on or near the computer 2200. In addition, a recording medium such as a hard disk or a RAM provided in a server system connected to a dedicated communication network or the Internet can be used as the computer-readable medium, thereby providing the programs to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

EXPLANATION OF REFERENCES

2: electric power system, 10: distributed power supply, 12: electric power conversion apparatus, 13: node point, 14:

fault detection unit, 15: sensor unit, 16: switch, 20: conventional power supply, 23: node point, 100: control apparatus, 110: first calculation unit, 111: data complementing unit, 112: optimal power flow calculation unit, 113: storage unit, 114: command value storage unit, 115: command value set, 116: command value set, 120: command output unit, 122: selection unit, 124: transmission unit, 130: second calculation unit, 132: data acquisition unit, 134: data processing unit, 2200: computer, 2201: DVD-ROM, 2210: host controller, 2212: CPU, 2214: RAM, 2216: graphic controller, 2218: display device, 2220: input/output controller, 2222: communication interface, 2224: hard disk drive, 2226: DVD-ROM drive, 2230: ROM, 2240: input/output chip, 2242: keyboard

What is claimed is:

1. A control apparatus configured to control a plurality of distributed power supplies connected to an electric power system, the control apparatus comprising:
    a first calculation unit that comprises a processor to calculate in advance reactive electric power to be output by each of the distributed power supplies in an event of a fault on the electric power system; and
    a command output unit that comprises the processor to output, to each of the distributed power supplies, a command signal for causing each of the distributed power supplies to output the reactive electric power calculated in advance by the first calculation unit when it is detected that the fault has occurred on the electric power system;
    wherein the reactive electric power calculated in advance is selected from a solution for a type of the fault from solutions to optimal power flow problems calculated in advance, at a fixed cycle.

2. The control apparatus according to claim 1, wherein the first calculation unit uses the processor to calculate the reactive electric power in advance for each of two or more types of faults on the electric power system, and
    the command output unit uses the processor to output the command signal corresponding to a type of one of the faults that has occurred on the electric power system.

3. The control apparatus according to claim 1, wherein the first calculation unit uses the processor to further calculate an output suppression amount in each of the distributed power supplies in an event of a fault on the electric power system, and
    the command output unit uses the processor to output the command signal further including information corresponding to the output suppression amount.

4. The control apparatus according to claim 2, wherein the first calculation unit uses the processor to further calculate an output suppression amount in each of the distributed power supplies in an event of a fault on the electric power system, and
    the command output unit uses the processor to output the command signal further including information corresponding to the output suppression amount.

5. The control apparatus according to claim 3, wherein the first calculation unit uses the processor to calculate the output suppression amount in advance for each of two or more types of faults on the electric power system, and
    the command output unit uses the processor to output the command signal corresponding to a type of one of the faults that has occurred on the electric power system.

6. The control apparatus according to claim 1, further comprising:
    a second calculation unit that comprises the processor to input, to the first calculation unit, system data including an electric power parameter at a plurality of nodes of the electric power system, wherein
    the first calculation unit uses the processor to update the reactive electric power to be output by the distributed power supplies, at a cycle longer than a data cycle of the system data, based on the system data.

7. The control apparatus according to claim 2, further comprising:
    a second calculation unit that comprises the processor to input, to the first calculation unit, system data including an electric power parameter at a plurality of nodes of the electric power system, wherein
    the first calculation unit uses the processor to update the reactive electric power to be output by the distributed power supplies, at a cycle longer than a data cycle of the system data, based on the system data.

8. The control apparatus according to claim 3, further comprising:
    a second calculation unit that comprises the processor to input, to the first calculation unit, system data including an electric power parameter at a plurality of nodes of the electric power system, wherein
    the first calculation unit uses the processor to update the reactive electric power to be output by the distributed power supplies, at a cycle longer than a data cycle of the system data, based on the system data.

9. The control apparatus according to claim 5, further comprising:
    a second calculation unit that comprises the processor to input, to the first calculation unit, system data including an electric power parameter at a plurality of nodes of the electric power system, wherein
    the first calculation unit uses the processor to update the reactive electric power to be output by the distributed power supplies, at a cycle longer than a data cycle of the system data, based on the system data.

10. The control apparatus according to claim 1, wherein the first calculation unit uses the processor, when an electric power parameter at any node among a plurality of nodes of the electric power system cannot be acquired, to complement missing data at the node at which the electric power parameter cannot be acquired.

11. The control apparatus according to claim 2, wherein the first calculation unit uses the processor, when an electric power parameter at any node among a plurality of nodes of the electric power system cannot be acquired, to complement missing data at the node at which the electric power parameter cannot be acquired.

12. The control apparatus according to claim 3, wherein the first calculation unit uses the processor, when an electric power parameter at any node among a plurality of nodes of the electric power system cannot be acquired, to complement missing data at the node at which the electric power parameter cannot be acquired.

13. The control apparatus according to claim 5 wherein the first calculation unit uses the processor, when an electric power parameter at any node among a plurality of nodes of the electric power system cannot be acquired, to complement missing data at the node at which the electric power parameter cannot be acquired.

14. The control apparatus according to claim 6 wherein the first calculation unit uses the processor, when an electric power parameter at any node among a plurality of nodes of the electric power system cannot be acquired, to complement missing data at the node at which the electric power parameter cannot be acquired.

15. A control method of controlling a plurality of distributed power supplies connected to an electric power system by a computer, the control method comprising:
performing, using a processor, first calculation of calculating in advance reactive electric power to be output by each of the distributed power supplies in an event of a fault on the electric power system; and
outputting, using the processor, to each of the distributed power supplies, a command signal for causing each of the distributed power supplies to output the reactive electric power calculated in advance in the first calculation when it is detected that the fault has occurred on the electric power system;
wherein the reactive electric power calculated in advance is selected from a solution for a type of the fault from solutions to optimal power flow problems calculated in advance, at a fixed cycle.

16. A non-transitory computer-readable medium having recorded thereon a program that, when executed by a computer, causes the computer to execute a sequence of controlling a plurality of distributed power supplies connected to an electric power system, the control comprising:
performing, using the computer, first calculation of calculating in advance reactive electric power to be output by each of the distributed power supplies in an event of a fault on the electric power system; and
outputting, using the computer, to each of the distributed power supplies, a command signal for causing each of the distributed power supplies to output the reactive electric power calculated in advance in the first calculation when it is detected that the fault has occurred on the electric power system;
wherein the reactive electric power calculated in advance is selected from a solution for a type of the fault from solutions to optimal power flow problems calculated in advance, at a fixed cycle.

17. The control apparatus according to claim 1, wherein each of the optimal power flow problems includes, as an evaluation function, a sum of electric power transmission loss at normal operation, an output suppression amount at normal operation, an output suppression amount at a potential fault, an electric power deviation amount during normal operation, and an electric power deviation amount at the potential fault.

* * * * *